United States Patent
Venezia et al.

(10) Patent No.: US 9,313,676 B2
(45) Date of Patent: Apr. 12, 2016

(54) SYSTEMS AND METHODS FOR PREDICTIVE ANALYSIS OF TECHNICAL SUPPORT ISSUES

(71) Applicant: Vonage America Inc., Holmdel, NJ (US)

(72) Inventors: Lisa M. Venezia, South Amboy, NJ (US); Eric Verbel, Flanders, NJ (US); Kavitha Sreenath, Frisco, TX (US); Jose Martinez, Jackson, NJ (US)

(73) Assignee: Vonage America Inc., Holmdel, NJ (US)

( * ) Notice: Subject to any disclaimer, the term of this patent is extended or adjusted under 35 U.S.C. 154(b) by 0 days.

(21) Appl. No.: 14/090,567

(22) Filed: Nov. 26, 2013

(65) Prior Publication Data

US 2015/0147999 A1 May 28, 2015

(51) Int. Cl.
*H04M 11/00* (2006.01)
*H04W 24/04* (2009.01)
*H04M 3/51* (2006.01)

(52) U.S. Cl.
CPC ............ *H04W 24/04* (2013.01); *H04M 3/5175* (2013.01); *H04M 2215/32* (2013.01)

(58) Field of Classification Search
CPC ..................... H04M 2215/32; H04M 1/72519; H04W 24/00; G06N 3/049

USPC .......................... 455/405, 423, 550.1; 706/21
See application file for complete search history.

(56) References Cited

U.S. PATENT DOCUMENTS

| | | | |
|---|---|---|---|
| 7,593,904 B1* | 9/2009 | Kirshenbaum et al. | 706/12 |
| 8,112,451 B1* | 2/2012 | Graham et al. | 707/802 |
| 8,719,073 B1* | 5/2014 | Kirshenbaum et al. | 705/7.32 |
| 2004/0119502 A1* | 6/2004 | Chandar et al. | 326/96 |
| 2006/0248054 A1* | 11/2006 | Kirshenbaum et al. | 707/3 |
| 2007/0110043 A1* | 5/2007 | Girard | 370/352 |
| 2008/0095339 A1* | 4/2008 | Elliott et al. | 379/93.01 |

* cited by examiner

*Primary Examiner* — Danh Le
(74) *Attorney, Agent, or Firm* — Moser Taboada; Joseph Pagnotta (57) ABSTRACT

Embodiments of the present invention generally relate to a method and system for predictive analysis of technical issues in a technical support environment. In some embodiments, the method may include receiving information associated with a first technical support issue reported by a customer, associating at least one category with the first technical support issue based on an analysis of the received information and a history of system operation status data, and transmitting at least a portion of the information associated with the first technical support issue and the associated at least one category to an agent workstation.

19 Claims, 6 Drawing Sheets

SYSTEMS AND METHODS FOR PREDICTIVE ANALYSIS OF TECHNICAL SUPPORT ISSUES

FIELD

Embodiments of the present invention are related to technical support analysis in a telephony environment.

BACKGROUND

In the present telecommunication environment, placing calls and transmitting information between telephony devices is more prevalent than ever. With the constantly growing volume of subscribers, devices and services, communication network providers have been continually striving to maintain pace with respect to cost, bandwidth, and communication quality. In particular, quality of service is a key factor for consumers when deciding which provider to subscribe to or over which network to place a phone call. A customer having a problem establishing a call or who experiences poor call quality will not be encouraged to continue using the service if the problem is not resolved quickly and satisfactorily.

Therefore, there is a need to provide technical support agents supporting the telecommunication environment with access to effective tools for improving customer service and call quality so that customer problems may be resolved in the most efficient and effective manner possible.

SUMMARY

Embodiments of the present invention generally relate to a method and system for predictive analysis of technical issues in a technical support environment. In some embodiments, the method may include receiving information associated with a first technical support issue reported by a customer, associating at least one category with the first technical support issue based on an analysis of the received information and a history of system operation status data, and transmitting at least a portion of the information associated with the first technical support issue and the associated at least one category to an agent workstation.

In some embodiments, a method for predictive analysis of technical issues in a technical support environment may include receiving a description of a technical issue associated with a customer contact, receiving system operation status data associated with the customer contact, determining at least one category of technical issues from a plurality of categories of technical issues based upon application of at least one rule to the system operation status data, and transmitting the determined at least one category of technical issues.

In some embodiments, a system for predictive analysis of technical issues in a technical support environment is provided herein. The system may include at least one processor, at least one input device coupled to at least one network, and at least one storage device storing processor executable instructions, which, when executed by the at least one processor, performs a method. The method may include receiving information associated with a first technical support issue reported by a customer, associating at least one category with the first technical support issue based on an analysis of the received information and a history of system operation status data, and transmitting at least a portion of the information associated with the first technical support issue and the associated at least one category to an agent workstation.

Other and further embodiments of the present invention are described below.

BRIEF DESCRIPTION OF THE DRAWINGS

Embodiments of the present invention, briefly summarized above and discussed in greater detail below, can be understood by reference to the illustrative embodiments of the invention depicted in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation.

DETAILED DESCRIPTION

In the following description, references are made to a telephony device. The terms "telephony device" or "communication device" are intended to encompass any type of device capable of acting as a telephony device. This includes a traditional analog telephone, an Internet Protocol (IP) telephone, a computer running IP telephony software, cellular telephones, mobile telephony devices such as smartphones that can connect to a data network and run software applications, such as the Apple iPhone™, mobile telephony devices running the Android™ operating system, Blackberry™ mobile telephones, and mobile telephones running the Symbian® operating system.

Moreover, certain devices that are not traditionally used as telephony devices may act as telephony devices once they are configured with appropriate client software. Thus, some devices that would not normally be considered telephony devices may become telephony devices or IP telephony devices once they are running appropriate software. One example would be a desktop or a laptop computer that is running software that can interact with an IP telephony system over a data network to conduct telephone calls. Another example would be a portable computing device, such as an Apple iPod Touch™, which includes a speaker and a microphone. A software application loaded onto an Apple iPod Touch™ can be run so that the Apple iPod Touch™ can interact with an IP telephony system to conduct a telephone call.

The following description will also refer to telephony communications and telephony activity. These terms are intended to encompass all types of telephony communications, regardless of whether all or a portion of the calls are carried in an analog or digital format. Telephony communications could include audio or video telephone calls, facsimile transmissions, text messages, SMS messages, MMS messages, video messages, and all other types of telephony and data communications sent by or received by a user. These terms are also intended to encompass data communications that are conveyed through a publicly switched telephone network (PSTN) or Voice over Internet Protocol (VOIP) telephony system. In other words, these terms are intended to encompass any communications whatsoever, in any format, which traverse all or a portion of a communications network or telephony network.

The term "call" or "telephone call" is used in the following description for ease of reference, clarity and brevity. However, the systems and methods described below which involve handling, routing and terminating calls would also apply to systems and methods of handling, routing and terminating other forms of telephony communications. Thus, the terms call and telephone call are intended to include other forms of telephony communications.

Although the following description refers to a technical service support system in a telephony communications environment, it is to be understood that the telephony communications environment is meant as an example only and embodiments of the invention are not limited to such an environment. The methods described herein have applications in many technical service support environments and applications.

Figure 1:
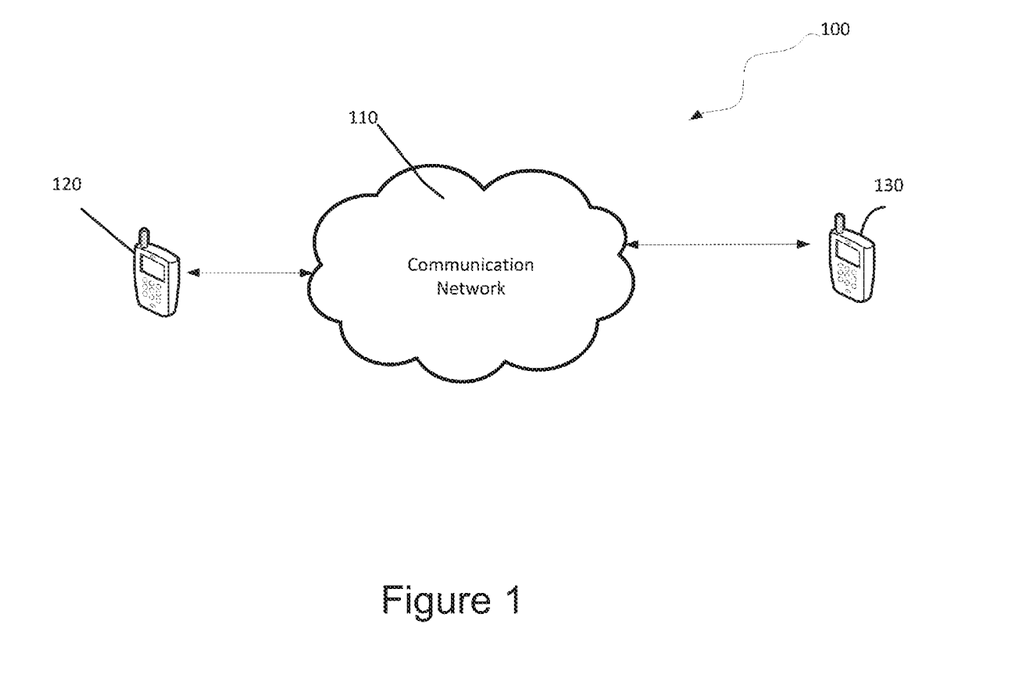
FIG. 1 is a block diagram of a communications environment that can connect a telephony communication session between two communication devices in accordance with one or more embodiments of the present invention.

FIG. 1 depicts a communications environment that can be used to establish telephony communications between telephony devices. In order to facilitate the description of embodiments of the invention, the communication environment will be described in terms of an exemplary IP telephony system, however, embodiments of the invention is not limited to IP telephony systems. The elements in FIG. 1 include an Internet Protocol (IP) telephony system 100 capable of establishing a telephony communication between the first communication device 120 and the second communication device 130 via a data network 110. Of course, the example shown in FIG. 1 is not limited to only first and second communication devices and the system envisions communication between a large number of communication devices.

Data network 110 may include various gateways, servers and databases not shown. Impairments in the quality of the communication between the first communication device 120 and the second communication device 130 may result in one or both of the device users reporting a technical issue, as further described below.

Figure 2:
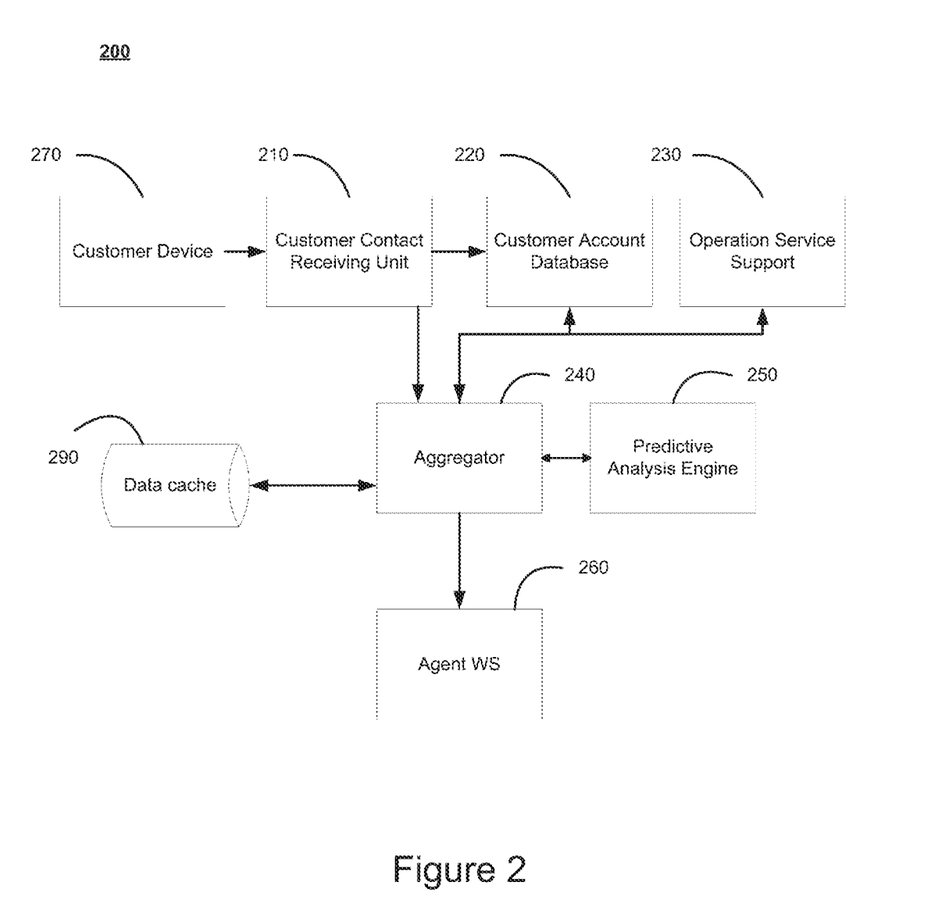
FIG. 2 is a diagram showing a technical service environment for a telephony communication in accordance with one or more embodiments of the present invention.

FIG. 2 illustrates elements of a technical support system 200 that is part of a larger technical service environment (not shown). The technical support system 200 includes a customer contact receiving unit 210 which receives a customer contact including technical complaints and inquiries from a customer device 270. Customer device 270 may be a device that has the capability to contact customer contact receiving unit 210 via one or more channels including but not limited to a phone call, voice message, text message, contact through a website, email or live text-based chat. Among other things, the customer contact receiving unit 210 may receive identifying information associated with the customer contact, such as a caller ID, which may assist in identifying a customer account associated with the customer contact. The customer contact may be identified through the customer's phone number, login identity, email address or other identifying characteristics.

The technical support system 200 further includes an aggregator 240, a customer account database 220, and an operation service support (OSS) module 230. The aggregator 240 is communicatively coupled to the customer contact receiving unit 210 which informs the aggregator 240 when a new customer contact has been received. The aggregator 240 is also communicatively coupled to customer account database 220 and OSS module 230, and may request and receive data from each. The aggregator 240 compiles data from customer account database 220, OSS module 230 and a predictive analysis engine 250 which will be described in more detail below. The predictive analysis engine 250 applies rules to categories of technical issues to produce a confidence level that a problem that the customer contact has reported falls within the category.

The customer account database 220 includes account information for each customer account, such as the customer name, billing information, address, account number, telephone number, and the like. The customer account database 220 may contain a description of the most recent technical complaint or inquiry received in customer contact receiving unit 210; it may also contain a history of previous technical issues received. The OSS module 230 is communicatively coupled with one or more network elements of the service environment and may retrieve data from those elements, including registration data, traffic data, and the like. For example, the OSS module 230 may retrieve data from various network elements including telephony devices such as first and second communication devices 120 and 130. In some embodiments, the data from first and second communication devices 120 and 130 includes network activity information of the local network environment that the devices use to connect to data network 110. The data from first and second communication devices 120 and 130 may also include event data such as a connection loss or power loss. Other network elements that the OSS retrieves data from may include servers that are used to connect communication devices 120 and 130 to the data network 110. The server data may include registration data and traffic data. In some embodiments, the OSS module 230 collects system operation status data on a constant basis. The system operation status data may be information collected for a specific customer or information related to system operations for a plurality of customers. When the technical support contact is received, the aggregator 240 requests system operation status data and then begins receiving the system operation status data from customer account database 220 and OSS module 230. Examples of the type of system operation status data that may be obtained is shown below in Table 1. In some embodiments, the aggregator 240 is communicatively coupled to data cache 290. Upon receiving data from the customer account database 220 and/or OSS module 230, the aggregator 240 stores some or all of the received data in data cache 290, as discussed in further detail below. The aggregator 240 may also be connected to an agent web service 260 that can access technical support details from the aggregator 240 for resolving the customer technical complaints and inquiries. All customer contacts may be accessed by the agent through the agent web service 260. The agent web service 260 provides an agent access to the customer details and system information as described herein.

Figure 3:
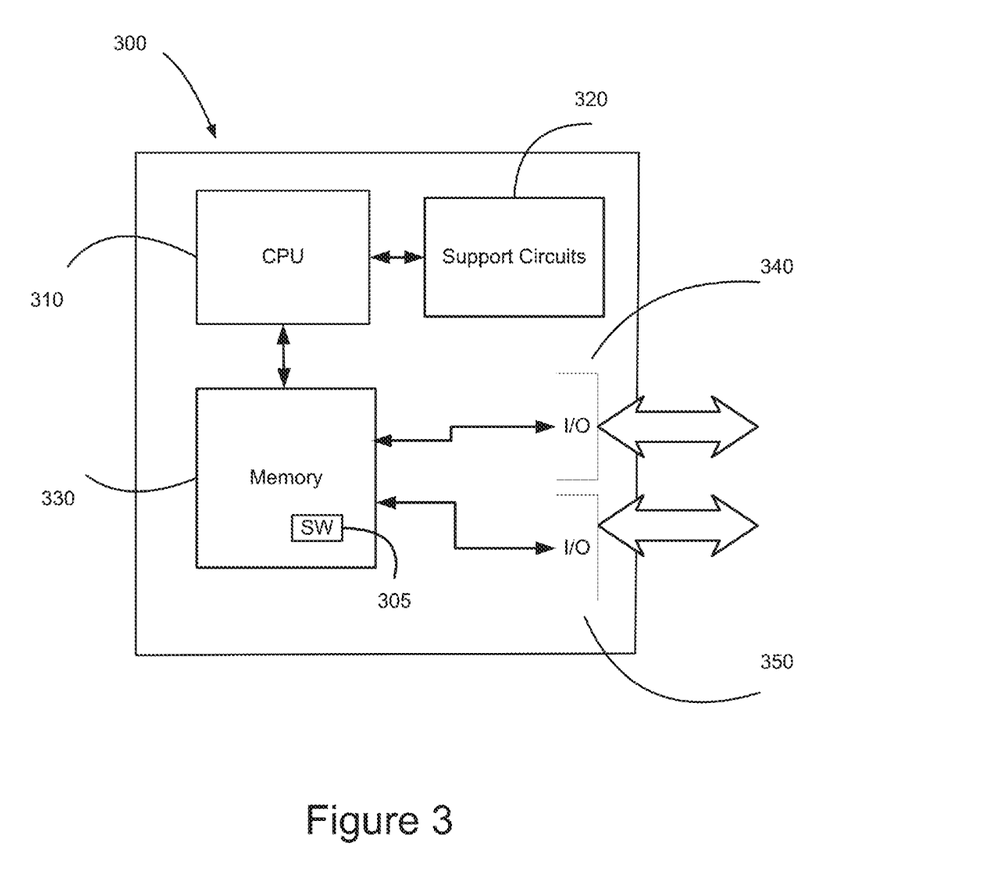
FIG. 3 is a schematic diagram of a processing unit that may be used to practice one or more embodiments of the present invention.

FIG. 3 illustrates elements of a processing unit 300 that can be incorporated in elements of the IP telephony system 100 to accomplish various functions. The IP telephony system 100 could utilize multiple processing units 300 located at various locations, along with their operating components and programming, each carrying out a specific or dedicated portion of the functions performed by the IP telephony system 100.

The processing unit 300 shown in FIG. 3 may be one of any form of a general purpose computer processor used in operating an IP based communication system. The processing unit 300 comprises a central processing unit (CPU) 310, a memory 330, and support circuits 320 for the CPU 310. The processing unit 300 also includes provisions 340/350 for connecting the processing unit 300 to customer equipment via one or more access points and a data channel provided by a cellular service provider, as well as possibly one or more input/output devices (not shown) for accessing the processor and/or performing ancillary or administrative functions related thereto. The provisions 340/350 are shown as separate bus structures in FIG. 3; however, they may alternately be a single bus structure without degrading or otherwise changing the intended operability of the processing unit 300.

The memory 330 is coupled to the CPU 310. The memory 330, or computer-readable medium, may be one or more of readily available memory such as random access memory (RAM), read only memory (ROM), floppy disk, hard disk, flash memory or any other form of digital storage, local or remote, and is preferably of non-volatile nature. The support circuits 320 are coupled to the CPU 310 for supporting the processor in a conventional manner. These circuits include cache, power supplies, clock circuits, input/output circuitry and subsystems, and the like.

Software routine 305, when executed by the CPU 310, causes the processor 300 to perform processes of the disclosed embodiments, and is generally stored in the memory 330. The software routine 305 may also be stored and/or executed by a second CPU (not shown) that is remotely located from the hardware being controlled by the CPU 310. Also, the software routines 305 could be stored remotely from the CPU. For example, the software could be resident on servers and memory devices that are located remotely from the CPU, but which are accessible to the CPU via a data network connection.

The software routine 305, when executed by the CPU 310, transforms the general purpose computer into a specific purpose computer that performs one or more functions of the IP telephony system 100. Although the processes of the disclosed embodiments may be discussed as being implemented as a software routine, some of the method steps that are disclosed therein may be performed in hardware as well as by a processor running software. As such, the embodiments may be implemented in software as executed upon a computer system, in hardware as an application specific integrated circuit or other type of hardware implementation, or a combination of software and hardware. The software routine 305 of the disclosed embodiments is capable of being executed on any computer operating system, and is capable of being performed using any CPU architecture.

Figure 4:
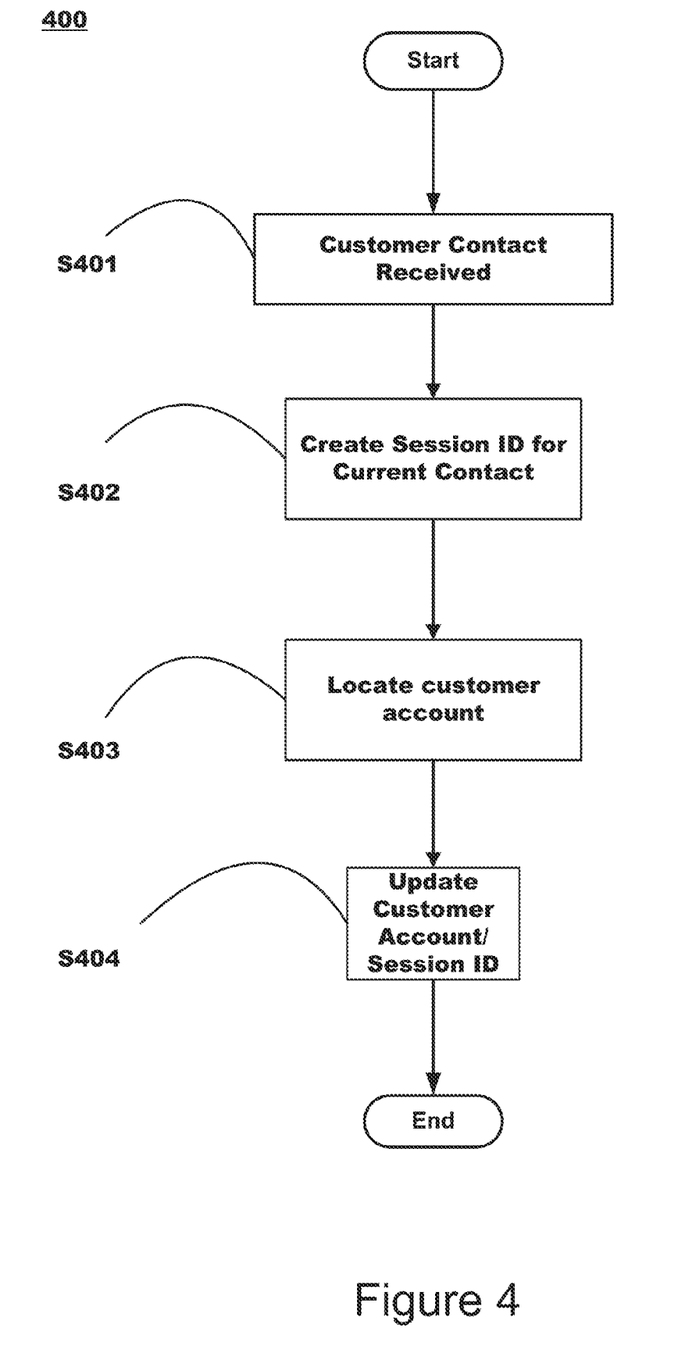
FIG. 4 is a flow diagram illustrating steps of a method for receiving a customer contact and creating a customer record.

FIG. 4 illustrates steps of a method 400 for receiving a customer contact and creating a session ID. The method 400 begins and proceeds to step S401 where the technical support system 200 receives a customer contact. The customer contact may be received, for example, via customer contact receiving unit 210.

At step S402 the customer contact receiving unit 210 creates a session ID for the current contact and includes a description of the technical support issue, and the time and date that the customer contact was received or created. The session ID identifies the current customer contact for processes further discussed below. The description may be created by a live representative. In some embodiments, the live representative may enter the description of the technical support issue via agent web services 260 or other customer service agent input system. Alternatively, the description may be created from an automated phone reception system and entered as a translation from a voice recognition program. The description may also be extracted from a chat or email description or entered from a web service electronic form.

At step S403, the technical support system 200 locates a customer account associated with the customer contact from the customer account database 220. A customer phone number or other identifier may be used to locate the customer account in customer account database 220.

At step S404, the customer account is updated to include the session ID of the current customer contact. The method 400 ends after step S404.

Figure 5:
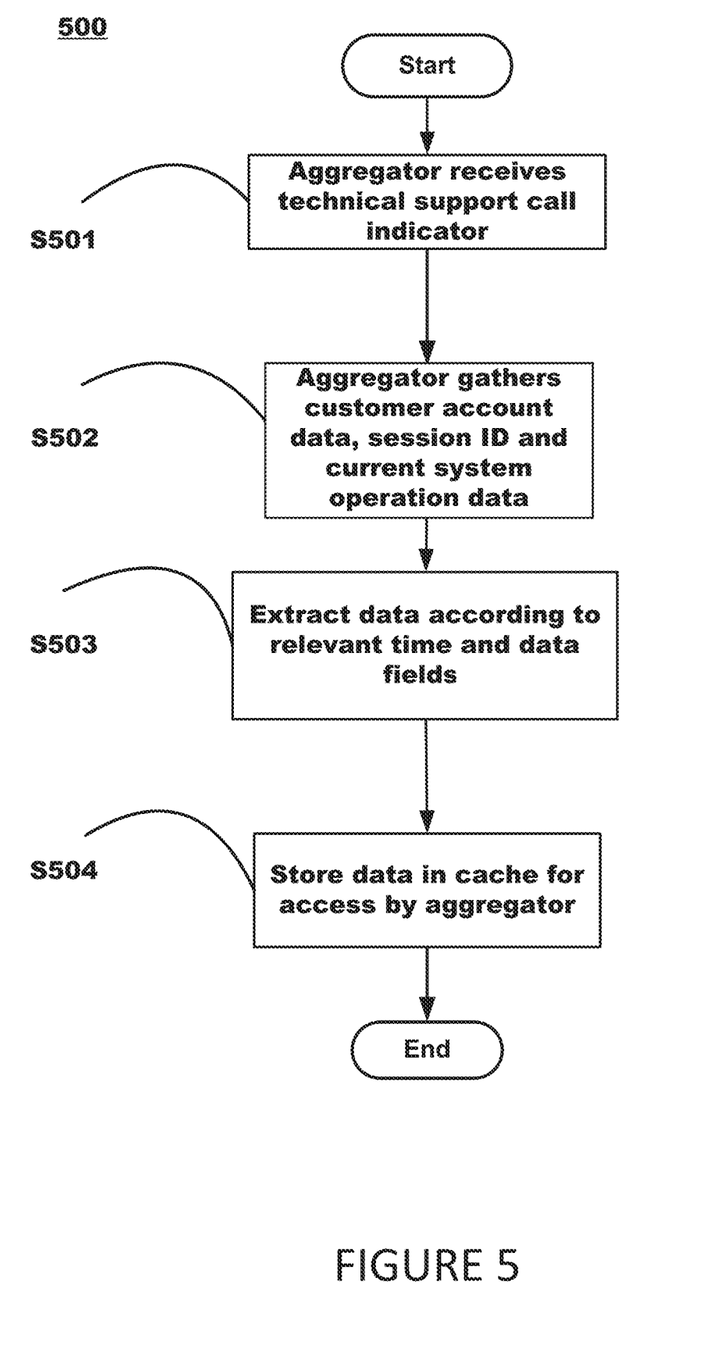
FIG. 5 is a flow diagram illustrating the steps of an aggregator data preparation method.

FIG. 5 illustrates steps of an aggregator data preparation method 500. The method 500 begins and proceeds to step S501 when the aggregator 240 receives a notification of the customer contact and prepares to receive, or otherwise obtain, data. At step S502, the aggregator 240 will begin gathering data after the customer contact (such as described in S401 above) is received. Specifically, in some embodiments, the aggregator 240 collects, or otherwise obtains, customer account data, session ID and current system operation data of IP telephony network 100 from OSS module 230, customer account database 220 and data cache 290. The aggregator 240 requests system operation status data and receives the requested system operation status data in preparation for delivering the data to the predictive analysis engine 250 and to the agent web services 260 as will be described further below. The data aggregator 240 will gather the system operation status data related to that customer and begin to collect system operation status data at the moment a technical support contact is received. The system operation status data is received from the OSS module 230 and comprises data on the performance of various system operations to provide a measure of the system's performance. The OSS module 230 collects system operation status data from various network elements or sources on a continual basis, collecting and storing system operation status data for all callers at all times. Aggregator 240 requests data relevant to the current customer contact. In some embodiments, the requested data may include, but is not limited to, the system operation status data connected to the customer identified in step 403, including customer devices, servers and other network equipment that has been used to connect calls for the current customer contact. That is, the system operation status data connected, or otherwise associated, with the customer may be obtained from at least one of one or more devices associated with the customer, or one or more telecommunication system devices that have been used to connect calls for the customer. In other embodiments, the system operation status data may be associated with a plurality of different customers. The system operation status data associated with a plurality of different customers may be obtained from one or more telecommunication system devices that have also been used, or could have been used, to connect calls for the customer. The data is retrieved by aggregator 240 from OSS 230 as described above with respect to FIG. 2. Examples of such network elements or sources include, but are not limited to, Gateway Call Detail Records (CDR), billing and call quality measurement databases. The CDR for a call includes various items of information about the call, such as the originating telephone number, the destination telephone number, the time that the call started and ended, as well as various other items of information. Examples of data fields received from these sources are shown below in Table 1.

TABLE 1

| Gateway | Billing | Call Quality Measurement |
|---|---|---|
| Originating number | Charges | Latency |
| Destination number | Domestic/international | Jitter |
| Start time | Transfers | Packet Count |
| Call duration | Forwarding | Out of Order |
| Aborted calls | | No Audio |
| Registration Activity | | Call completion |
| Registration Status | | Location |

Table 1 is not intended as an exhaustive list but provides only examples of data that may be received from the OSS 230. In addition, the data for each field is recorded over long periods of time and for each call in the IP telephony system 100. Processing the entirety of the data would not be practical as it would require an unrealistic amount of processing time and would not provide an efficient response for the customer. Therefore, the data is truncated by the aggregator preparation method 500 as follows.

At step S503, the aggregator 240 filters and extracts the data over a relevant time period and relevant data fields. In one embodiment, the relevant time period for a given customer contact may be initially determined by an estimate of a number of days of accumulated data that will be sufficient to perform the predictive analysis method discussed below. Relevant factors for making this determination may include customer call activity, call quality and device registration activity. For example, a time period of three (3) days may be initially determined.

For example, if the call activity of a customer is infrequent, a longer period may be necessary for accurate determination as opposed to a customer who makes frequent calls each day requiring less time to obtain an accurate sample of data. Similarly, call registration activity (e.g. several registration attempts to establish or maintain a call are needed) may require more or less time depending on the customer usage. Furthermore, call quality issues may be intermittent requiring more time to accumulate sufficient data for determining a technical issue by the methods described below. The data received is then stored in data cache 290 by aggregator 240.

In an alternative embodiment, the determination for the time period may be predetermined and static. The data will be truncated by time for a given time period for all customer contacts rather than based on the relevant factors for determining a relevant time period of a given customer contact discussed above.

The data is further truncated according to relevant data fields. In one embodiment the relevant data fields may be determined by the description of the technical support issue. For example, a customer contact reporting an audio problem may not need forwarding data, charge data, call duration, etc. Thus, it is not necessary to store these fields in data cache 290 for the current customer contact.

In an alternative embodiment, the data fields may be predetermined and static. The data fields in this case do not require a determination based on the description but are the given fields for all customer contacts.

At step S504, the now reduced and more manageable set of data is transmitted to data cache 290 for access by the aggregator 240 when required. The data is stored under the session ID given in method 400.

Figure 6:
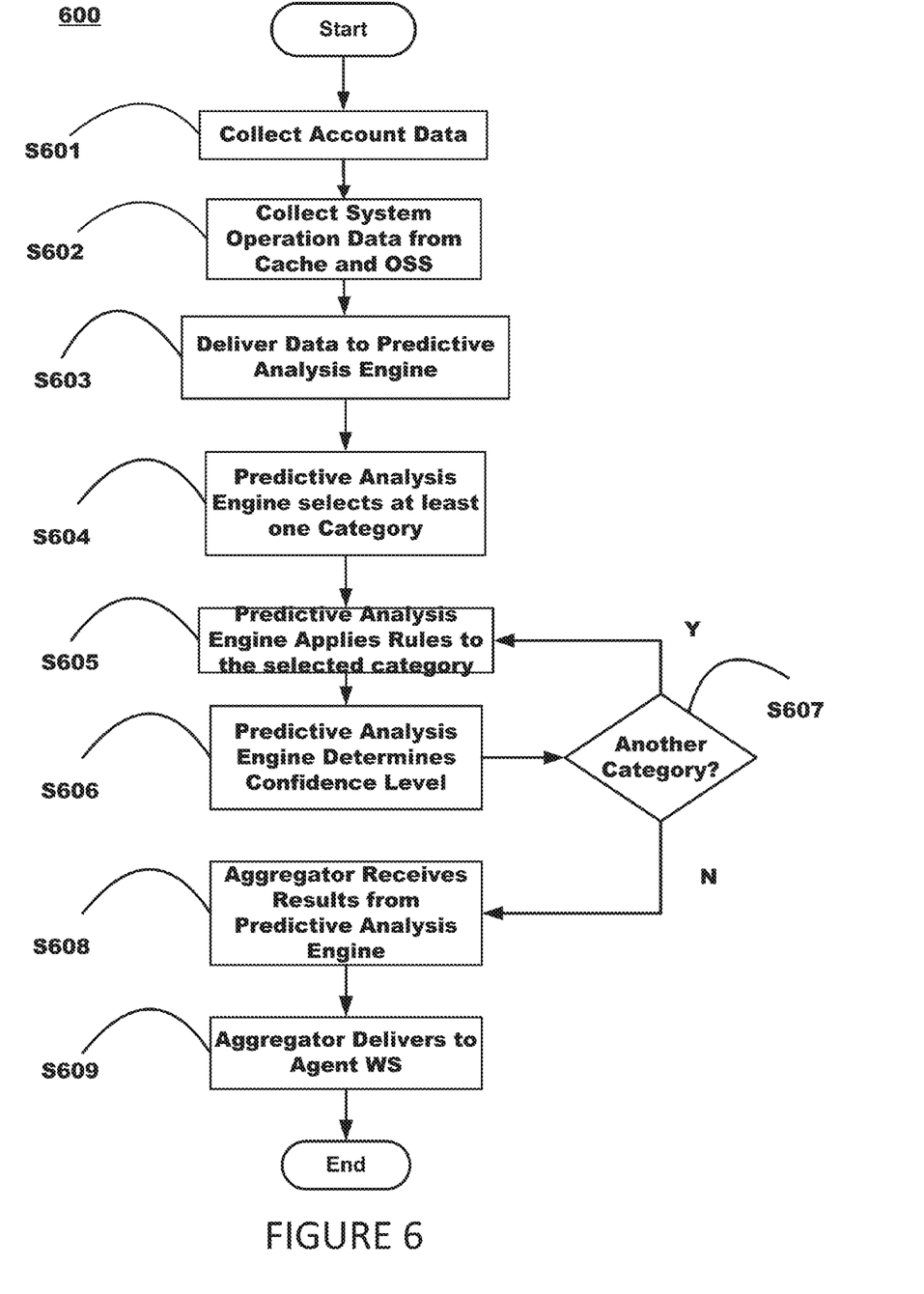
FIG. 6 is a flow diagram illustrating steps of a method for a predictive analysis of technical support issues in accordance with one or more embodiments of the present invention.

FIG. 6 illustrates steps of a method 600 for predictive analysis of technical support issues. The steps of the method will be described with reference to FIG. 2. The method begins and proceeds to step S601 where aggregator 240 receives, or otherwise obtains, customer account data from customer account database 220.

At step S602, aggregator 240 collects session ID and current system operation data of IP telephony network 100 from OSS module 230 and data cache 290 (some system operation status data, such as registration data, may be refreshed often as it changes constantly over short periods of time so it is not practical to store the data in the cache 290 but must be received real-time from OSS 230). The system operation data may include but are not limited to the data fields such as those listed in Table 1.

At step S603, aggregator 240 delivers the data collected in steps S601 and S602 to the predictive analysis engine 250.

At step S604, predictive analysis engine 250 (which includes/stores information associated with categories of technical issues) selects at least one of the categories with which to begin the predictive analysis. The categories are predetermined descriptions of technical areas applicable to the IP telephony system 100 and are designed to cover a range of related technical issues. The categories, though general, help to identify the types of technical support issues to which the customer contact likely relates, as will be discussed below. For example, the categories may include but are not limited to installation issues, no dial tone issues, outbound call completion issues, inbound call completion issues, audio issues and fax issues.

At step S605, the predictive analysis engine 250 applies predetermined rules to the selected category in order to determine if the selected category encompasses the technical support issue of the customer contact. Predictive analysis engine 250 may apply multiple rules to each category. The rules are logical operations applied to each category and the system operation data delivered by aggregator 240, which then produces a result that determines a likelihood that the category encompasses the technical issue. The likelihood may be described in terms of a confidence level which is described further below.

At step S606, predictive analysis engine 250 will determine a confidence level for each technical issue in that category and thus, the most probable cause associated with the technical issue received from customer contact receiving unit 210. The confidence level provides a measure of the likelihood that the category encompasses the probable cause of the customer contact technical issue. The confidence level for each category is a result of the logical operation of applying the rule to the category and the system operation data illustrated by the embodiments described below. The confidence level may be listed as high, medium, low or none and is predetermined based on the rule and the system operation data. In some embodiments, the confidence level may be listed as a numerical value (e.g., 0-100% confidence), and/or may be displayed in various colors to indicate the different levels of confidence.

For example, one category may be "audio issues." "Audio issues" may be determined to be a potential category for the inbound customer contact if certain conditions apply. In the case of "audio issues," the system may look for a pattern or history of connected calls with multiple destinations, each with impairments to audio quality. More specifically, the explicit condition may be defined as follows. A given call may be determined to have impairments to audio quality if jitter (see Table 1) exceeds a certain threshold value. The rule may further provide that if more than a threshold number of calls—or a proportion of calls—within the last three days had impairments to audio quality, then there is a "high" degree of confidence that "audio issues" is the issue the customer contact relates to. Optionally, there may be a lower threshold number (or proportion) of calls that would result in a "medium" degree of confidence that the customer contact relates to "audio issues." Even lower thresholds could apply to result in "low" or "no" levels of confidence that the category applies.

In one embodiment, the category "outbound domestic calls" may be determined as a potential category for the customer contact if certain conditions apply. The system may look for a pattern or history of successive unsuccessful attempts to reach a domestic number. Specifically, it may be determined that above a threshold of successive redials in a given period of time to the same domestic number indicates "high" degree of confidence that the "outbound domestic calls" is the category that relates to the customer contact issue. Optionally, a lower threshold number of redials over the same or a different period of time may result in a "medium" or "low" degree of confidence that the customer contact relates to "outbound domestic calls."

In another embodiment, the category "no dial tone" may be determined as a potential category for the customer contact if certain conditions apply. The system may look for a pattern or history of registration activity. Specifically, it may be determined that above a threshold of device registrations over a given period of time indicates a "high" degree of confidence that the "no dial tone" is the category that relates to the customer contact issue. Optionally, a lower threshold number of device registrations over the same or a different period of time may result in a "medium" or "low" degree of confidence that the customer contact relates to "no dial tone."

At step S607, predictive analysis engine 250 will determine if there is another category (such as, for example, "no dial tone issues") for which to apply the rules and determine a confidence level. If yes, then the method applies the rules to the new category at step S605. If not, then the method continues to step S608.

At step S608, predictive analysis engine 250 returns the results to the aggregator 240 and at step S609 the aggregator 240 reports the results to the agent web service 260. The agent web service 260 receives the customer account information, the current system operation data and the results of the predictive analysis engine 250 from aggregator 240. The aggregator 240 will also include a description of the technical issue reported by the customer to agent web service 260. The agent web service 260 is a visual graphical representation that facilitates an agent assisting the customer in resolving the technical issue. The results provided by aggregator 240 along with the customer and system information assist the agent in providing efficient and timely help for the customer.

In another embodiment the description of the technical support issue may determine the category that will be applied in method 600. For example, if based on the description the customer has a problem with the audio aspect of the telephony service, the predictive analysis engine 250 may apply rules to the audio category based on that description without applying the rules to other categories. In this manner the predictive analysis may be more efficient and deliver a result to the agent web service 260 more rapidly.

The terminology used herein is for the purpose of describing particular embodiments only and is not intended to be limiting of embodiments of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

While the foregoing is directed to embodiments of the present invention, other and further embodiments of the invention may be devised without departing from the basic scope thereof, and the scope thereof is determined by the claims that follow.

The invention claimed is:

1. A method for predictive analysis of technical support issues of a telecommunication system in a technical support environment, comprising:
    receiving information associated with a first technical support issue reported by a customer;
    associating at least one category with the first technical support issue based on an analysis of the received information and a history of system operation status data;
    determining a confidence level for each of the at least one categories associated with the first technical support issue, wherein the confidence level is an indicator that provides a measure of likelihood that the associated at least one category includes a probable cause of the first technical support issue; and
    transmitting at least a portion of the information associated with the first technical support issue and the associated at least one category to an agent.

2. The method of claim 1, wherein each of the at least one category is a technical issue category that includes a predetermined description of a technical issue for the category.

3. The method of claim 2, wherein the predetermined descriptions are descriptions of technical issues applicable to an IP telephony systems.

4. The method of claim 1, wherein the confidence level for each category is based on a logical operation of applying a rule to the history of system operation status data.

5. The method of claim 1, wherein the at least a portion of the information associated with the first technical support issue transmitted to the agent workstation includes a description of the first technical support issue reported by the customer.

6. The method of claim 1, wherein the system operation status data used to associate the at least one category to the first technical support issue is also transmitted to the agent workstation.

7. The method of claim 1, wherein the system operation status data used to associate the at least one category to the first technical support issue includes data on a performance of various telecommunication system operations to provide a measure of the telecommunication system's performance.

8. The method of claim 1, wherein the system operation status data includes information associated with at least one (a) an originating number used by the customer, (b) a destination number called by the customer, (c) whether a call was a domestic or international call, (d) time of a call, (e) duration of a call, or (f) call quality measurement information.

9. The method of claim 1, wherein the system operation status data is associated with the customer.

10. The method of claim 9, wherein the system operation status data associated with the customer is obtained from at least one of one or more devices associated with the customer, or one or more telecommunication system devices that could been used to connect calls for the customer.

11. The method of claim 1, wherein the system operation status data is associated with a plurality of different customers.

12. The method of claim 11, wherein the history of system operation status data is system operation status data obtained for a predetermined time period.

13. A system for predictive analysis of technical support issues of a telecommunication system in a technical support environment, comprising:
   a) at least one processor;
   b) at least one input device coupled to at least one network; and
   c) at least one storage device storing processor executable instructions which, when executed by the at least one processor, performs a method including:
   receiving information associated with a first technical support issue reported by a customer;
   associating at least one category with the first technical support issue based on an analysis of the received information and a history of system operation status data;
   determining a confidence level for each of the at least one categories associated with the first technical support issue, wherein the confidence level is an indicator that provides a measure of likelihood that the associated at least one category includes a probable cause of the first technical support issue; and
   transmitting at least a portion of the information associated with the first technical support issue and the associated at least one category to an agent workstation.

14. The system of claim 13, wherein each of the at least one category is a technical issue category that includes a predetermined description of a technical issue for the category.

15. The system of claim 13, wherein the system operation status data used to associate the at least one category to the first technical support issue includes data on a performance of various telecommunication system operations to provide a measure of the telecommunication system's performance.

16. The system of claim 13, wherein the system operation status data includes information associated with at least one (a) an originating number used by the customer, (b) a destination number used by the customer, (c) whether a call was a domestic or international call, (d) time of a call, (e) duration of a call, or (f) call quality measurement information.

17. A method for predictive analysis of technical support issues of a telecommunication system in a technical support environment, comprising:
   receiving a report of a first technical support issue from a customer via a customer device, wherein the report is received via one of a phone call or a live chat;
   receiving identifying information associated with the customer;
   receiving information associated with a first technical support issue reported by the customer;
   associating at least one category with the first technical support issue based on an analysis of the received information and a history of system operation status data obtained for a predetermined time period; and
   transmitting the identifying information associated with the customer and at least a portion of the information associated with the first technical support issue and the associated at least one category to an agent while in communication with the customer.

18. The method of claim 17, further comprising:
   determining a confidence level for each of the at least one categories associated with the first technical support issue, wherein the confidence level is an indicator that provides a measure of likelihood that the associated at least one category includes a probable cause of the first technical support issue, wherein the confidence level for each category is based on a logical operation of applying a rule to the history of system operation status data.

19. The method of claim 17, wherein the system operation status data used to associate the at least one category to the first technical support issue at least one of:
   (i) includes data on a performance of various telecommunication system operations to provide a measure of the telecommunication system's performance,
   (ii) includes information associated with at least one (a) an originating number used by the customer, (b) a destination number called by the customer, (c) whether a call was a domestic or international call, (d) time of a call, (e) duration of a call, or (f) call quality measurement information,
   (iii) is associated with the customer, wherein the system operation status data associated with the customer is obtained from at least one of one or more devices associated with the customer, or one or more telecommunication system devices that could been used to connect calls for the customer, or
   (iv) is associated with a plurality of different customers.

* * * * *